W. N. DENNISON.
SOUND REPRODUCING MACHINE.
APPLICATION FILED MAR. 12, 1907. RENEWED JAN. 20, 1915.

1,150,346.

Patented Aug. 17, 1915.
4 SHEETS—SHEET 1.

Fig. 1.

WITNESSES:

INVENTOR
Wilburn N Dennison
BY
ATTORNEY.

W. N. DENNISON.
SOUND REPRODUCING MACHINE.
APPLICATION FILED MAR. 12, 1907. RENEWED JAN. 20, 1915.

1,150,346.

Patented Aug. 17, 1915.
4 SHEETS—SHEET 4.

WITNESSES:

INVENTOR
Wilburn N Dennison
BY
ATTORNEY.

UNITED STATES PATENT OFFICE.

WILBURN N. DENNISON, OF MERCHANTVILLE, NEW JERSEY, ASSIGNOR TO VICTOR TALKING MACHINE COMPANY, A CORPORATION OF NEW JERSEY.

SOUND-REPRODUCING MACHINE.

1,150,346.  Specification of Letters Patent.  Patented Aug. 17, 1915.

Application filed March 12, 1907. Serial No. 361,979. Renewed January 20, 1915. Serial No. 3,407.

*To all whom it may concern:*

Be it known that I, WILBURN N. DENNISON, of the borough of Merchantville, county of Camden, and State of New Jersey, have invented certain new and useful Improvements in Sound-Reproducing Machines, of which the following is a full, clear, and complete disclosure.

This invention relates to improvements in sound reproducing machines, in which sound waves are impressed upon a fluid current by means moving in accordance with a sound record.

One object of the invention is to combine in a single compact, convenient structure, mechanism for reproducing from a sound record undulations in a current of air, and means for supplying a steady current of purified air to be acted upon.

A further object is to provide a talking machine of the character above described with a sound box and connections, an air purifier, a separator and a direct connected electrically driven air blower which will be self cooling and noiseless in operation.

Further objects will be understood as the invention is further disclosed, the purpose as a whole being to provide a machine by which sounds will be reproduced from records with greater clearness, distinctness and accuracy than has heretofore been attained.

In the accompanying drawings

Referring to the drawings, one embodiment of this invention comprises a cabinet 1, upon the top 2 of which is mounted a turntable 3 for supporting the usual or any suitable sound record 4. Depending from a bracket 5 secured exteriorly to the rear side of the cabinet is a swinging hollow tapering sound box arm 6 carrying at its inner end a sound box 7 arranged to coöperate with the sound record 4. The swinging sound box arm opens upwardly at its larger end into a sound amplifying horn 8 carried by the bracket 5. Depending within the cabinet from the top 2 is the usual or any suitable motor or actuating mechanism 9 arranged to rotate the turntable 3. The motor 9 is provided with the usual or any suitable governor 10 for controlling its speed. The cabinet 1 is preferably divided into an upper and lower compartment by the horizontal partition 11, which is spaced below the actuating mechanism 9.

Figure 1:
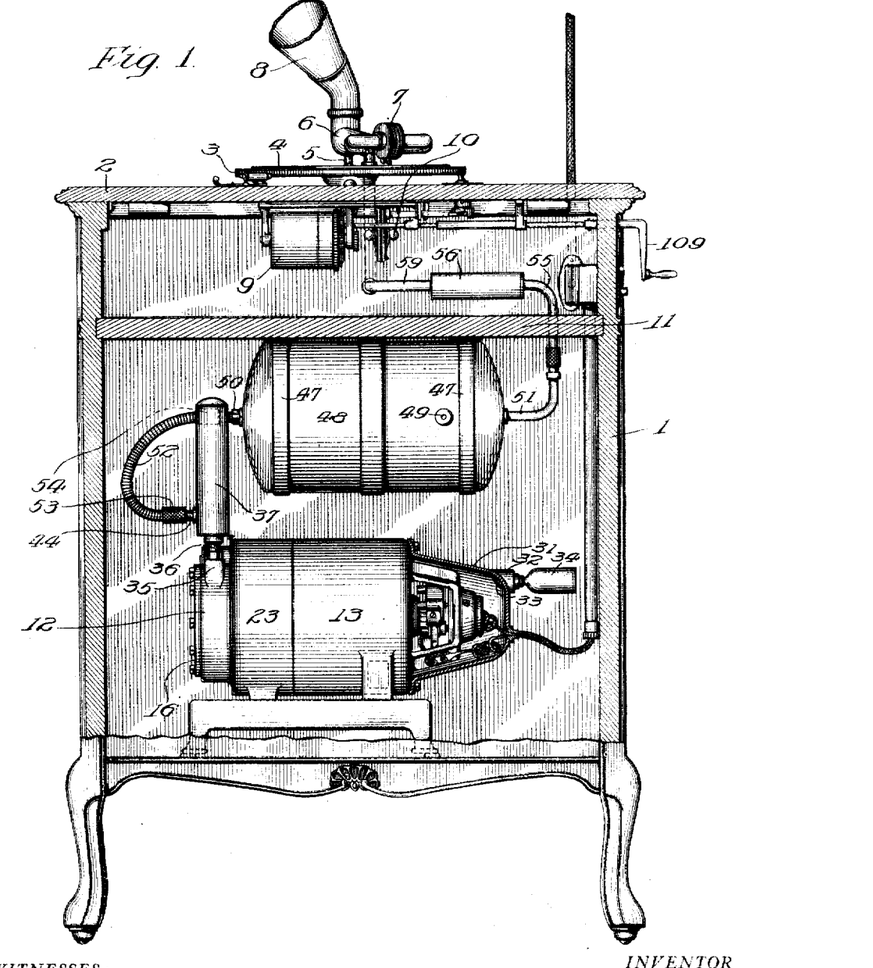
Figure 1 is a fragmentary front elevation of a talking machine constructed in accordance with this invention.
Figure 2:
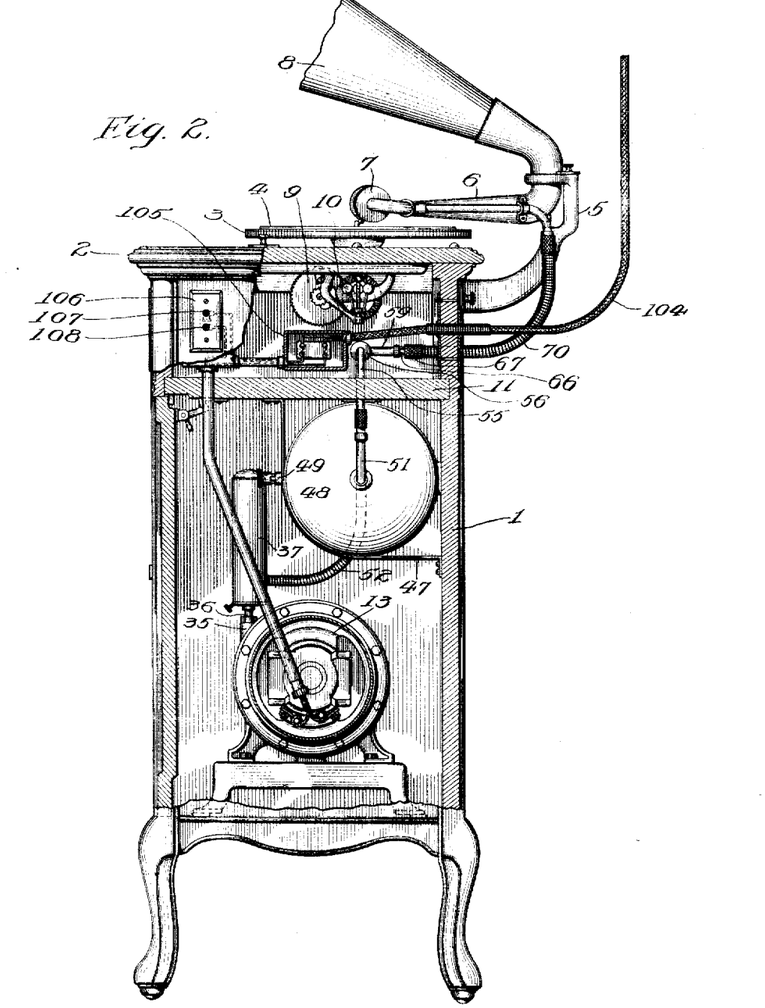
Fig. 2 a fragmentary side elevation of the same.
Figures 3, 4, 5, 6, 7:
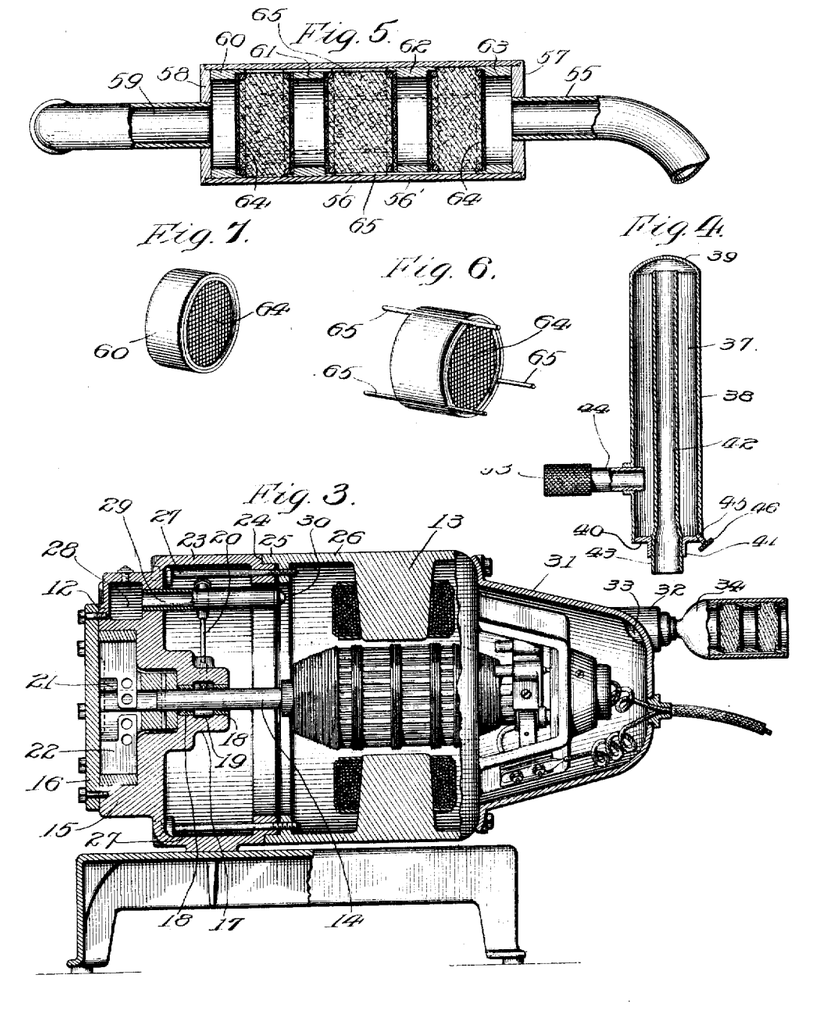
Figs. 3, 4 and 5 are enlarged fragmentary elevations partly in longitudinal vertical section of details of the same.
Figs. 6 and 7 are perspective views of details of the same.
Figures 8, 9:
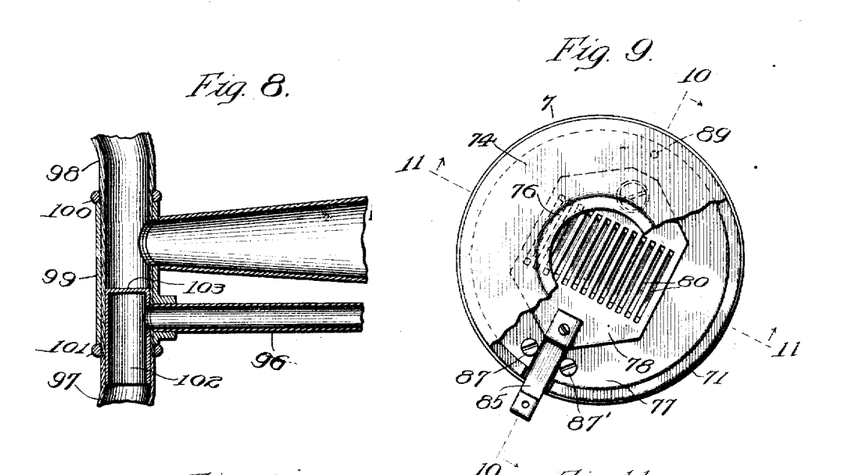
Fig. 8 is an enlarged central horizontal section of a portion of the same.
Fig. 9 a fragmentary end view of a portion of the same.
Figure 10:
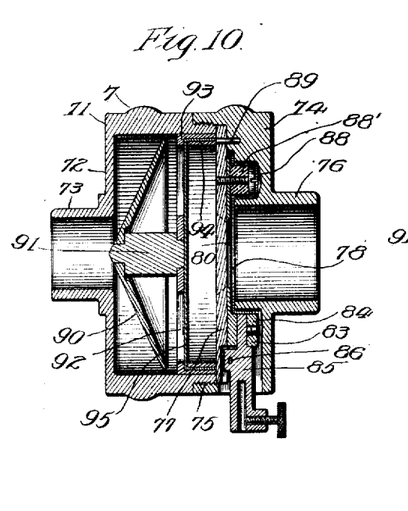
Fig. 10 a sectional view taken on line 10—10 of Fig. 9.
Figure 11:
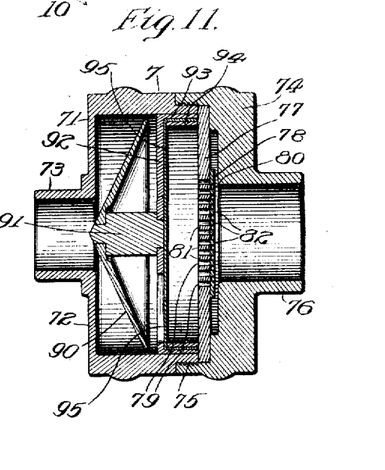
Fig. 11 a sectional view taken on line 11—11 of Fig. 9.

For supplying the sound box 7 with a current of air there is provided an air compressor, which is arranged within the lower compartment of the cabinet and which is preferably mounted upon the floor of the cabinet. This compressor comprises, as shown in Fig. 3, a rotary blower 12 driven by an electric motor 13, the armature shaft 14 of the motor being extended to form the driving shaft of the blower. The blower consists of a cylinder 15, provided at its outer end with a removable cylinder head 16, and having an eccentrically extended inner end 17 forming bearings 18 for the said motor shaft. Between the said bearings 18 is an annular oil chamber 19 fed by an oil duct 20.

The cylinder of the blower is arranged eccentrically with respect to the motor shaft 14, and within the cylinder is carried upon the end of the said shaft a piston wheel 21 which is provided with radial slots and with piston blades 22 slidably mounted in the slots.

The blower 12 is provided with an inwardly extending cylindrical casing 23 corresponding in diameter to the diameter of the casing of the motor, and having an annular recess 24 upon its inner edge to receive the flanged edge 25 of the motor casing 26 and is held against the motor casing by means of bolts 27. Upon its upper side the blower 12 is provided with an elongated inlet chamber 28, and with an inlet duct 29 leading into said chamber from the motor chamber. The outer end of said inlet duct is reduced and provided with an orifice 30 of less area than the transverse area of the main portion of the duct. The motor is entirely inclosed, and its outer end is covered with an air tight cap 31, provided with an outwardly extending lug 32 having an inlet duct 33 therethrough, over which is mounted an air filter 34, the details of which will be more fully described hereinafter. This arrangement and construction is such that all air that enters the blower must come first through the filter passing over the armature of the motor, and so on into the inlet duct 29 leading into the inlet chamber of the blower. Thus the air is first purified of all dust and foreign matter before it enters the motor casing, and being drawn around the magnet coils and over the armature of the motor, as it passes through the motor, it has the very desirable effect of keeping the motor cool.

In operating this machine the motor is run at a comparatively high speed, which, on account of the small opening into the inlet duct of the blower, forms a partial vacuum in the inlet duct and inlet chamber of the blower. It has been found that by thus constructing and operating the blower a much steadier flow of air is obtained and the operation of the blower is rendered practically noiseless.

For removing from the air any oil or similar matter taken up by the air in its discharge through the blower, the discharge pipe 35 of the said blower terminates in a thimble 36 which is screw threaded therein and leads into a separator 37. This separator 37 as shown in Fig. 4, comprises an outer tube 38 having an upper closed and rounded end 39 integral therewith and a lower end 40 formed separately and securely fastened into the outer tube. Passing through the said lower end and held in place by an outwardly extending flange 41 is an inner tube 42 which extends centrally and longitudinally of the outer tube and terminates at its upper end in close proximity to the upper rounded end of the outer tube. The inner tube extends downwardly a short distance beyond the end of the outer tube and is provided with an enlarged lower end 43 adapted to fit over the taper end of the said thimble 36 of the discharge pipe. Extending horizontally through the outer tube near the lower end thereof is the outlet pipe 44 terminating outwardly in a tapered end and projecting inwardly beyond the inner surface of the outer tube. A hole 45 closed by a screw 46 is provided in the lower end of the separator whereby the separator may be emptied.

For equalizing the pressure of the air after it leaves the separator 37, there is provided a pressure equalizer, which is located above and upon one side of the separator and is secured against the under side of the partition 11 and against one side of the cabinet by metal bands 47. This equalizer consists of a tank 48 provided with a safety valve 49, an inlet pipe 50 and an outlet pipe 51. The said inlet and outlet pipes have tapered outer ends adapted to fit into connections. A short flexible tube 52 provided with terminal sockets 53 and 54 connects the outlet pipe 44 of the separator to the said inlet pipe 50 of the equalizer.

For purifying the air after it has left the pressure equalizer there is located within the upper compartment of the cabinet and connected to the outlet pipe of the equalizer by a downwardly turned pipe 55 which passes through the partition of the cabinet, a second air filter 56, similar in construction to the filter 34 hereinbefore mentioned. This air filter 56 comprises as shown in detail in Figs. 5, 6 and 7, an outer tube 56, provided with ends 57 and 58 having inlet and outlet pipes connected thereto. Within the cylinder are secured a series of bushings 60, 61, 62 and 63. The bushings 60 and 63 occupying the ends of the cylinder are formed as shown in Fig. 7, each having a wire screen 64 covering one end thereof. The intermediate bushings 61 and 62 are formed as shown in Fig. 6 and have secured longitudinally thereto spacing bars 65 which are riveted into slots provided therefor in the outer surfaces of the bushings, and extend in each direction therefrom, the length of the bar outside the bushings being equal to the width of the space desired between the bushings. When the bushings are positioned within the cylinder the ends of the bars of one bushing rest against the edges of the adjoining bushings to hold the bushings in the desired relationship. Each end of these intermediate bushings is covered with a wire screen and the spaces between the screens of adjoining bushings are filled with cotton or other similar material for filtering the air. One end 57 of the cylinder is held in its position by screw threads, and is readily removable so that the filter may be taken apart for cleaning.

The outlet pipe 59 of the filter extends for a short distance in the line of the axis of the filter horizontally and then turns at right angles, and terminates within the casing in a taper end 66 adapted to fit in a socket 67 of a flexible pipe 70 which conducts the air to the sound box.

The details of the sound box used in this construction are shown in Figs. 8, 9, 10 and 11 where it is seen that the sound box comprises a cylindrical casing 71 provided with an end 72 integral therewith and having a tubular extension 73 coaxial therewith forming an inlet for the sound box. The opposite end of the cylindrical casing 71 is provided with a cap or cover 74 which is screw threaded thereon by means of an internal thread 75 engaging in corresponding ing external threads upon the casing 71. The cap 74 is provided with a tubular extension 76 coaxial therewith and forming an outlet for the sound box.

In an annular groove between the sound box casing 71 and its cap 74 is held, in a fixed position, a flat circular disk or valve seat 77 which forms a seat for a valve 78. The disk or valve seat 77 is provided centrally with a series of parallel oblong rectangular ports 79. The valve 78 consists of a thin normally flat flexible plate of metal and is provided with a series of slots 80 corresponding in width to the thickness of the bridges 81 between the ports in the valve seat, and the valve is so constructed and arranged that normally the bridges 82 between the ports of the valve just cover the ports in the valve seat.

The valve 78 is provided on its lower side with a lug 83 in an aperture in which is securely fastened the reduced upper end 84 of a stylus bar 85. The cap of the sound box is recessed to permit the free movement of the stylus bar, and the stylus is mounted to oscillate in a plane perpendicular to the valve upon a transverse spring member 86, which is secured at its ends to the stationary valve seat by means of screws 87 and 87'.

To hold the valve 78 yieldingly against its seat under a fluid pressure a headed screw 88 passes loosely through a hole in the free end of the valve and is threaded into the valve seat. A spring, or rubber washer 88' surrounds the screw 88 between the head of the screw and the surface of the valve. A suitable recess is provided in the cap of the sound box to receive the screw and washer. To hold the valve seat securely in position with respect to the sound box casing when the cap of the casing is being screwed into position, a positioning pin 89 is provided extending through the valve seat and into the cap.

Within the casing, between the inlet side of the sound box and the valve, is situated a conical air spreader and distributer 90, the outer diameter of which is slightly less than the inner diameter of the casing. This spreader is mounted upon a central stud 91 supported by radial arms 92 carried by a ring 93 fitting snugly within the case and abutting against the said fixed member of the valve. Within this ring 93 and against the radial arms 92, by means of an inner ring 94, is secured a closely woven silk diaphragm 95. This diaphragm acts as a filter and pressure regulator.

The sound box is connected at its inlet to a supply tube 96 by means of a U shaped tube 97 the inner end of which fits snugly over the tubular extension 73, forming the inlet of the sound box. The supply pipe 96 extends rearwardly close to the sound box arm 6 and substantially parallel to the axis thereof and is rigidly connected to the sound box arm in any suitable manner. The rear portion of this tube 96 terminates in one-quarter of a turn downwardly to receive the upwardly projecting end of the flexible tube 70. At its outlet the sound box is connected to the taper sound arm 6 by means of a U shaped tube 98 the inner end of which fits snugly over the tubular extension 76 forming the outlet of the sound box. The outer ends of these U tubes are pivotally connected to a sleeve 99, the said tube 98 extending through said sleeve and being provided with the collars 100 and 101 at opposite ends of the sleeve respectively to hold the tube rotatively in position. A short inner tube 102 having an inner closed end 103 fits tightly within the outer end of said tube 98 thus forming an articulated joint between the supply tube, 96 and the sound box 73, and projects beyond the end of said sleeve 99. The said U tube 97 fits tightly over the projecting end of the said inner tube 102 and the said closed end 103 forms a partition between the U tube 97 and the U tube 98. Upon one side of this partition the sleeve is provided with an aperture over which is mounted the tapering arm 6 leading into the amplifying horn. Upon the other side of the partition the sleeve is provided with an aperture into which is inserted the end of the supply tube 96. Apertures are provided through the tubes within the sleeve which register with the apertures in the sleeve when the sound box is in its operative position. When the sound box is raised from the record in a vertical plane the U tubes revolve with respect to the sleeves bringing their apertures out of register with the apertures in the supply pipe and the tapering arm thereby preventing the passage of the current of air through the sound box. This feature presents a convenient means of preventing a waste of air pressure when records are being changed and when the sound box is not in use.

In the operation of the sound box, air is forced through the supply pipe and U tube and into the tubular extensions of the sound box where it strikes against the conical spreader and is turned outwardly against the inner surface of the sound box passing around the periphery of the spreader, and then moving toward the center through the silk diaphragm into the valve chamber, from whence it passes with a uniform pressure into the valve. The movable member of the valve is vibrated or flexed by means of the stylus actuated by the record so as to vary the amount of opening through which the air is permitted to pass, this operation producing sound waves in the air as it issues from the valve and reproducing the waves impressed upon the record.

Current for operating the machine is brought by means of a flexible conductor or cord 104 extending into the upper chamber of the casing to a fuse box 105 from whence it is led through suitable insulating pipes to the starting switch 106 which is controlled by buttons 107 and 108 projecting through the side of the case, and thence downwardly through the partition 11 to the motor. Arranged upon one side of the cabinet is the crank 109, for winding the said spring motor 9 which actuates the turn table.

In the operation of this machine as a whole, the air is first drawn through the filter 34, and then through the casing of the electric motor 13 where the air not only keeps the motor from overheating, as heretofore described, but is also incidentally slightly heated in return. This incidental heating of the air as it passes through the motor increases the hygroscopic property of the air which may result in a tendency to keeep the sound reproducing mechanism in the sound box dry and to produce other desirable results.

From the interior of the motor the air is drawn through the orifice 30, duct 29 and inlet chamber 28 and into the blower 12 from which it is driven upwardly into the separator 37 where it is freed from oil or similar matter taken up in its passage through the motor and blower and is also freed from water or vapor. From the separator the air passes through the pipes 52 into the pressure equalizer 48, and then passes through the pipes 54 and 55 into the second air filter 56 where the air is finally freed from any solid or liquid impurities that may have been carried through the equalizer.

The air thus purified then passes through the pipe 59, through the flexible pipe 70, and into the supply tube 96 fixed on the sound box arm. From the supply tube 96 the air passes through the U tube 97, through the sound box 7 where sound waves are impressed upon the air as heretofore described. From the sound box the sound waves are delivered through the U tube 98, and into the tapering sound box arm 6, and are then delivered from the machine through the sound amplifier 8.

There are many advantages due to the construction and arrangement of parts in this machine and some of these have been mentioned hereinbefore. By having a filter over the air inlet of the motor the greater part of the dust and foreign matter in the air is separated, as heretofore described, from the air before it enters the motor and the blower and this tends to insure the steady and smooth operation of these parts in particular and the machine as a whole.

By placing a separator between the blower and the equalizer it is possible to keep the motor and the blower sufficiently well lubricated to permit of their smooth and regular operation at the high speed necessary to insure the delivery of a substantially steady pressure of air from the blower without the possibility of any of the oil being carried into the sound box.

The pressure equalizer takes up and substantially eliminates the slight fluctuations in the pressure of the air current as it is delivered from the blower through the separator and also substantially eliminates the fluctuations in the pressure that without an equalizer might be caused by the uneven flow of the current through the sound box, and makes it possible to deliver a smooth and substantially uniform pressure of air to the sound box during the reproduction of sound. The filter arranged between the pressure equalizer and the sound box guards against the remote chance of any foreign matter being carried past the equalizer and into the sound box.

By this construction and arrangement the utmost protection is given to the sound box against the introduction of any dust or oil or other foreign matter, the slightest amount of which might interfere seriously with the operation of the delicate sound reproducing mechanism in the box. This construction also makes it possible to remove the foreign matter which collects in the separator, equalizer and filters or to repair or replace these parts without interfering with the adjustment of the sound reproducing mechanism in the sound box. In addition to the advantages hereinbefore pointed out there are obviously other advantages which will be apparent to those skilled in the art.

Although only a single embodiment of this invention has been described herein, it is obvious that various modifications might be made in the arrangement and construction of the various features of the device without departing from the spirit of this invention or the scope of the appended claims.

Having thus fully described my invention what I claim and desire to protect by Letters Patent is:

1. In a talking machine, the combination with a movable sound box provided with a valve port, and including a valve arranged to substantially close said port, and means to actuate said valve to impress sound waves upon a fluid current passing through said port, of means for causing a fluid current to pass through said port, and means supported independently of said sound box, for removing foreign matter from said current before it passes into said sound box.

2. In a talking machine, the combination with a movable sound box provided with a valve port, and including a valve arranged to substantially close said port, and means to actuate said valve to impress sound waves upon a fluid current passing through said port, of means for causing a fluid current to pass through said port, and a filter supported independently of said sound box, for removing foreign matter from said current before it passes through said sound box.

3. In a talking machine, the combination with a movable sound box provided with a valve port, and including a valve arranged to substantially close said port, and means to actuate said valve to impress sound waves upon a fluid current passing through said port, of means for causing a fluid current to pass through said port, and a separator supported independently of said sound box, for removing foreign matter from said current before it passes through said sound box.

4. In a talking machine, the combination with a movable sound box provided with a valve port, and including a valve arranged to substantially close said port, and means to actuate said valve to impress sound waves upon a fluid current passing through said port, of means for causing a fluid current to pass through said port, and a separator and a filter supported independently of said sound box, for removing foreign matter from said current before it passes through said sound box.

5. In a sound reproducing machine, the combination with a movable sound box, of a filter supported independently of said box and communicating therewith, and means for supplying air under pressure to said sound box through said filter.

6. In a sound reproducer, the combination with a movable sound box, of a pressure equalizer supported independently of said box and communicating therewith, and means for supplying air under pressure to said sound box through said equalizer.

7. In a sound reproducer, the combination with a movable sound box, of a separator supported independently of said box and communicating therewith, and means for supplying air under pressure to said box through said separator.

8. In a sound reproducer, the combination with a movable sound box, of a pressure equalizer, and a filter, both supported independently of said box, and means for supplying air under pressure to said box through said equalizer and said filter.

9. In a sound reproducer, the combination with a movable sound box, of a filter, a pressure equalizer, and a separator, all supported independently of said box and means for supplying air under pressure to said sound box through said filter, said equalizer and said separator.

10. In a sound reproducing machine the combination with a rotary record support of a sound box arranged to travel across said support, a stationary pressure equalizer communicating with said sound box, and means communicating with said equalizer for supplying air under pressure to said sound box through said equalizer.

11. In a sound reproducer, the combination with a rotary record support of a sound box arranged to swing across the same, a stationary pressure equalizer, a stationary filter, and means for forcing a fluid current to said sound box through said equalizer and filter.

12. In a sound reproducer, the combination with a sound box, of means for purifying a fluid current, and means communicating with said sound box through said first mentioned means for supplying said sound box with a fluid current, said sound box being arranged to move with respect to said purifying means when said sound box is in operation.

13. In a sound reproducer, the combination with a swinging sound box arm, of a sound box carried thereby, a stationary filter and a blower communicating with said sound box through said filter for supplying said sound box with a fluid current.

14. In a sound reproducer, the combination with a movable sound box, of a stationary separator and means communicating with said sound box through said separator for supplying said sound box with a fluid current.

15. In a sound reproducer, the combination with a movable sound box, of a stationary filter, a stationary pressure equalizer, a stationary separator, and a blower communicating with said sound box through said filter, said equalizer and said separator, for supplying said sound box with a fluid current.

16. In a talking machine, the combination with a cabinet providing two compartments, a rotary record support carried by said cabinet and arranged outside of said compartments, movable sound reproducing means arranged to coöperate with a record on said support, actuating means for said support in one of said compartments, an air compressor in the other of said compartments, and means arranged to conduct air from said compressor to said sound reproducing means and including means supported independently of said sound reproducing means for removing impurities from said air.

17. In a talking machine, the combination with a cabinet providing two compartments, a rotary record support carried by said cabinet and arranged outside of said compartments, movable sound reproducing means arranged to coöperate with a record on said support, actuating means for said support in one of said compartments, an air compressor in the other of said compartments, and means arranged to conduct air from said compressor to said sound reproducing means and including means supported independently of said sound reproducing means for removing impurities from said air, and means supported independently of said sound reproducing means for equalizing the pressure of said air.

In witness whereof I have hereunto set my hand this 9th day of March A. D. 1907.

WILBURN N. DENNISON.

Witnesses:
ALSTON B. MOULTON,
ALEXANDER PARK.

Copies of this patent may be obtained for five cents each, by addressing the "Commissioner of Patents, Washington, D. C."

It is hereby certified that in Letters Patent No. 1,150,346, granted August 17, 1915, upon the application of Wilburn N. Dennison, of Merchantville, New Jersey, for an improvement in "Sound-Reproducing Machines," an error appears in the printed specification requiring correction as follows: Page 2, line 84, for the reference-numeral "56" read *56'*; and that the said Letters Patent should be read with this correction therein that the same may conform to the record of the case in the Patent Office.

Signed and sealed this 5th day of October, A. D., 1915.

[SEAL.]

R. F. WHITEHEAD,
*Acting Commissioner of Patents.*